United States Patent
Ryu et al.

(10) Patent No.: US 8,209,240 B2
(45) Date of Patent: Jun. 26, 2012

(54) METHOD, APPARATUS, AND COMPUTER READABLE RECORDING MEDIUM FOR ACQUIRING INFORMATION ON PRODUCTS ATTACHED TO PERSON IN IMAGE DATA

(75) Inventors: Jung-hee Ryu, Seoul (KR); Junhwan Kim, Seoul (KR); Tae-hoon Kim, Gyeonggi-do (KR)

(73) Assignee: Olaworks, Inc., Seoul (KR)

( * ) Notice: Subject to any disclaimer, the term of this patent is extended or adjusted under 35 U.S.C. 154(b) by 398 days.

(21) Appl. No.: 12/672,467

(22) PCT Filed: Jul. 29, 2008

(86) PCT No.: PCT/KR2008/004409
§ 371 (c)(1),
(2), (4) Date: Feb. 5, 2010

(87) PCT Pub. No.: WO2009/020299
PCT Pub. Date: Feb. 12, 2009

(65) Prior Publication Data
US 2011/0251903 A1    Oct. 13, 2011

(30) Foreign Application Priority Data
Aug. 8, 2007 (KR) .................. 10-2007-0079808

(51) Int. Cl.
*G06F 17/30* (2006.01)
*G06Q 30/00* (2012.01)
(52) U.S. Cl. .................. 705/27.1; 705/26.61
(58) Field of Classification Search ................. 705/26.1, 705/26.61, 27.1, 27.2
See application file for complete search history.

(56) References Cited

U.S. PATENT DOCUMENTS

| 7,809,722 | B2 * | 10/2010 | Gokturk et al. | 707/736 |
| 8,010,402 | B1 * | 8/2011 | Sharma et al. | 705/7.29 |
| 2002/0010923 | A1 | 1/2002 | Pack et al. | |

(Continued)

FOREIGN PATENT DOCUMENTS

JP    2001-258011    9/2001

(Continued)

OTHER PUBLICATIONS

Unknown author, "A Robot That Fits in Your Pocket: Evolution Robotics' Image Recognition Technology Powers Mobile Visual Search in Cell Phones; Product Purchases and Information Are Now Only a Snapshot Away," Business Wire, New York, May 11, 2006, p. 1.*

(Continued)

*Primary Examiner* — Amee A Shah
(74) *Attorney, Agent, or Firm* — Husch Blackwell LLP (57) ABSTRACT

There are provided a method and an apparatus for acquiring information on products which are located on the body of a person appearing in image data. More particularly, a method and an apparatus for analyzing a posture of a person from image data, i.e., a face posture and a body posture of the person, displaying, according to information on the posture of the person, at least one of candidate regions in which products are attached to the body of the person in the image data on a screen of a terminal of a user, and, if the user selects any one of the candidate regions, providing the terminal with information on products same as or similar to an image of a specific product included in the selected candidate region.

19 Claims, 5 Drawing Sheets

U.S. PATENT DOCUMENTS

2009/0235364 A1* 9/2009 Cohen et al. .................... 726/28

FOREIGN PATENT DOCUMENTS

| | | |
|---|---|---|
| JP | P2001-258011 | 9/2001 |
| KR | 1019950000566 | 1/1995 |
| KR | 10-2002-0005418 | 1/2002 |
| KR | 1020020005418 A | 1/2002 |
| KR | 1020020067514 A | 8/2002 |
| KR | 1020030073330 A | 9/2003 |
| KR | 10-2007-0021741 | 2/2004 |
| KR | 10-2007-0014219 | 1/2007 |
| KR | 1020070001689 A | 1/2007 |

OTHER PUBLICATIONS

Huang, et al., Vector Boosting for Rotation Invariant Multi-View Face Detection, International Conference on Computer Vision, 2005.

Oren, et al., Pedestrian Detection Using Wavelet Templates, Computer Vision and Pattern Recognition Conference; Jun. 1997.

Felzenszwalb, Pictorial Structures for Object Recognition, International Journal of Computer Vision, Jan. 2005.

Jones, et al., Statistical Color Models with Application to Skin Detection, International Journal of Computer Vision, Jan. 2002.

Deng, et al., An Efficient Color Representation for Image Retrieval, IEEE Transactions on Image Processing, Jan. 2001, vol. 10, No. 1.

De Bonet, et al., Texture Recognition Using a Non-Parametric Multi-Scale Statistical Model, Conference on Computer Vision and Pattern Recognition, 1998.

Belongie, et al., Shape Matching and Object Recognition Using Shape Contexts, IEEE Transactions on Pattern Analysis and Machine Intelligence, vol. 24, No. 24, Apr. 2002.

* cited by examiner

STATE A

STATE B

STATE C

METHOD, APPARATUS, AND COMPUTER READABLE RECORDING MEDIUM FOR ACQUIRING INFORMATION ON PRODUCTS ATTACHED TO PERSON IN IMAGE DATA

TECHNICAL FIELD

The present invention relates to a method and an apparatus for acquiring information on products which are located on the body of a person appearing in image data; and more particularly, to a method and an apparatus for detecting a posture of a person, i.e., a face posture and a body posture and so on of the person, from the image data, displaying candidate regions indicating locations of the products attached to the person in the image data on a screen of a user terminal by referring to information on the detected posture and, if a user selects a specific candidate region among the candidate regions, providing the terminal with information on products same as or similar to a specific product included in the specific candidate region.

BACKGROUND ART

In general, a direct advertising such as a commercial film (CF) and a print advertising has been introduced via mass media. According to the direct advertising, information on products can be directly sent to consumers in concrete, but unwelcome attention of a user may be easily derived as well.

Contrary to the direct advertising, an indirect advertising is a marketing scheme of indirectly advertising products by exposing the products in dramas and films. The indirect advertising helps inform the public of the products less negatively than the direct advertising, but it fails to provide concrete information on the products. Accordingly, the desired end of the indirect advertising could be achieved only in case the consumers who recognize the products included in the dramas or the films search concrete information on the products in an aggressive way.

Recently, the huge leap forward in communication and broadcasting technology made possible by the advent of interactive television and the rapid spread of Internet has converged the direct and the indirect advertising by breaking down the wall therebetween, resulting in a new type of advertising. For example, Internet Protocol Television (IPTV) may provide detailed information on specific brand-name clothes if a viewer indicates the specific brand-name clothes which a performer appearing on a television screen wears by using a pointing device such as a mouse, a keyboard, a keypad and so forth, while the viewer is watching IPTV.

In this regard, a conventional method is disclosed in Korean Patent Application No. 10-2005-0057301 filed on Jun. 29, 2005 (Korea Patent No. 10-2007-0715598 dated Apr. 30, 2007) by SK Telecom, entitled "Method and System for Providing Extra Broadcasting Information Using Object Segmentation". Herein, disclosed is a terminal which receives information on a broadcast and information on a time and a region when and where objects included in the broadcast are outputted through a monitor, and then obtains detailed information on a specific object by using information on the time and the region at which the specific object is outputted on the monitor, if a user selects the specific object while watching the broadcast.

DISCLOSURE

Technical Problem

However, the aforementioned conventional method and system do not provide a means for obtaining detailed information on products appearing in image data if stored in a digital form or in a moving picture which is not generated by a broadcasting signal, since basic data from which information on the products can be obtained is confined to the broadcasting signal according to the conventional method and system. That is, the conventional method and system can be applied only to a limited case in which a specific scene of broadcasting content has been previously combined with information on a specific product appearing in the specific scene and the user obtains the information on the specific product by manipulating the pointing device.

Furthermore, according to the conventional method and system, detailed information on a product can not be obtained in case the product is not registered in a service server sending the broadcasting content, even if the image of the product is included in the broadcasting content.

In addition, according to the conventional method and system, only information on an image of a particular product is clearly displayed on a screen of the terminal, wherein the image of the particular product included in the specific scene of the broadcasting content has been provisionally arranged to be combined with advertisement information by a contract with an advertiser. Since it provides only one-way information, not two-way information, it can not arouse the users' interest. Specifically, a region for providing information on the other products except the particular product can not be activated on the screen even if the user has much interest in the information on the other products.

Hence, there is a growing need for developing a new method and a new system capable of more easily providing information on diverse products appearing in various forms of image data by overcoming the aforementioned drawbacks.

Technical Solution

It is, therefore, one object of the present invention to provide a method and an apparatus, by adopting technical configurations contrary to the aforementioned conventional method and system, for analyzing a posture of a person, i.e., a face posture and a body posture and so on of the person, from image data, displaying at least one of candidate regions indicating locations of products attached to the person in the image data on a screen of a terminal of a user by referring to information on the analyzed posture and, if the user selects a specific candidate region among the candidate regions by a pointing device, providing the terminal with information on products same as or similar to a specific product included in the specific candidate region, thereby obtaining information on desired products appearing in various image data more easily.

However, the objects of the present invention are not limited to the foregoing.

Advantageous Effect

In accordance with the present invention, contrary to the aforementioned conventional method for providing only information on a product having been previously arranged to be combined with advertisement information in image data, information on products same as or similar to diverse products appearing in various forms of image data having not been previously arranged to be combined with advertisement information can be obtained if the user selects the diverse products by the pointing device.

In accordance with the present invention, since the user can easily obtain the information on the diverse products appearing in the various image data by analyzing a posture of a person, i.e., a face posture and a body posture and so on of the person, from the image data, and locations of the products attached to the person in the image data are displayed automatically and clearly by referring to information on the analyzed posture, the user can become more interested in the images of the products and thus sales of products same as or similar to the products can be promoted.

DESCRIPTION OF DRAWINGS

The above objects and features of the present invention will become more apparent from the following description of the preferred embodiments given in conjunction with the accompanying drawings, in which.

BEST MODE

The configurations of the present invention for accomplishing the above objects of the present invention are as follows.

In one aspect of the present invention, there is provided a method for providing information on a product, including the steps of: (a) predicting a posture of a person included in image data; (b) determining candidate regions in which there are probabilities over a threshold value that images of products are included by referring to the predicted posture of the person and then displaying the candidate regions on a terminal; and (c) requesting information related to a specific product included in a specific candidate region if the specific candidate region is selected among the candidate regions.

In another aspect of the present invention, there is provided an apparatus for providing information on products appearing in image data, the apparatus including: a posture prediction part for predicting a posture of a person included in image data by analyzing at least one of a face posture and a body posture of the person; a candidate region extraction part for determining physical parts of the person, in which there are probabilities over a threshold value that the products are included, as the candidate regions by using information on the face posture and the body posture by referring to the predicted posture of the person and then displaying the candidate regions on a screen; and a communication part for requesting a retrieval server through a network to retrieve information on a specific product included in a specific candidate region, if the specific candidate region is selected among the candidate regions.

MODE FOR INVENTION

In the following detailed description, reference is made to the accompanying drawings that show, by way of illustration, specific embodiments in which the present invention may be practiced. These embodiments are described in sufficient detail to enable those skilled in the art to practice the present invention. It is to be understood that the various embodiments of the present invention, although different from one another, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The embodiments of the present invention will be described, in detail, with reference to the accompanying drawings.

Image Data

In accordance with the present invention, image data may be understood as digital data which includes visual information which can be replayed or displayed on a two- or a three-dimensional screen. For example, an image or a moving picture and so forth may be a kind of the image data. Herein, the moving picture may be provided to a terminal of a user through a streaming service like a broadcasting signal, or through a downloading service by which the moving picture is replayed after the moving picture is completely downloaded in the terminal beforehand. However, it should be noted that any type of image data, in addition to the moving picture provided through the foresaid two services, may be subject to the present invention.

Nonetheless, image data in which a shape of a person is included may be considered to be more important. In general, because the person is sure to appear in the image data with things, e.g., clothes and/or accessories such as earrings, a hat and so on, attached to his or her body, the things tend to be rapidly brought into fashion via mass media. Moreover, the advertisement market for the things is fast growing along with a desire of a consumer to keep up with the quickly changing trend. Therefore, the image data in which the person is included could be very attractive means for boosting a product advertising market and is becoming more important.

Entire System

Figure 1:
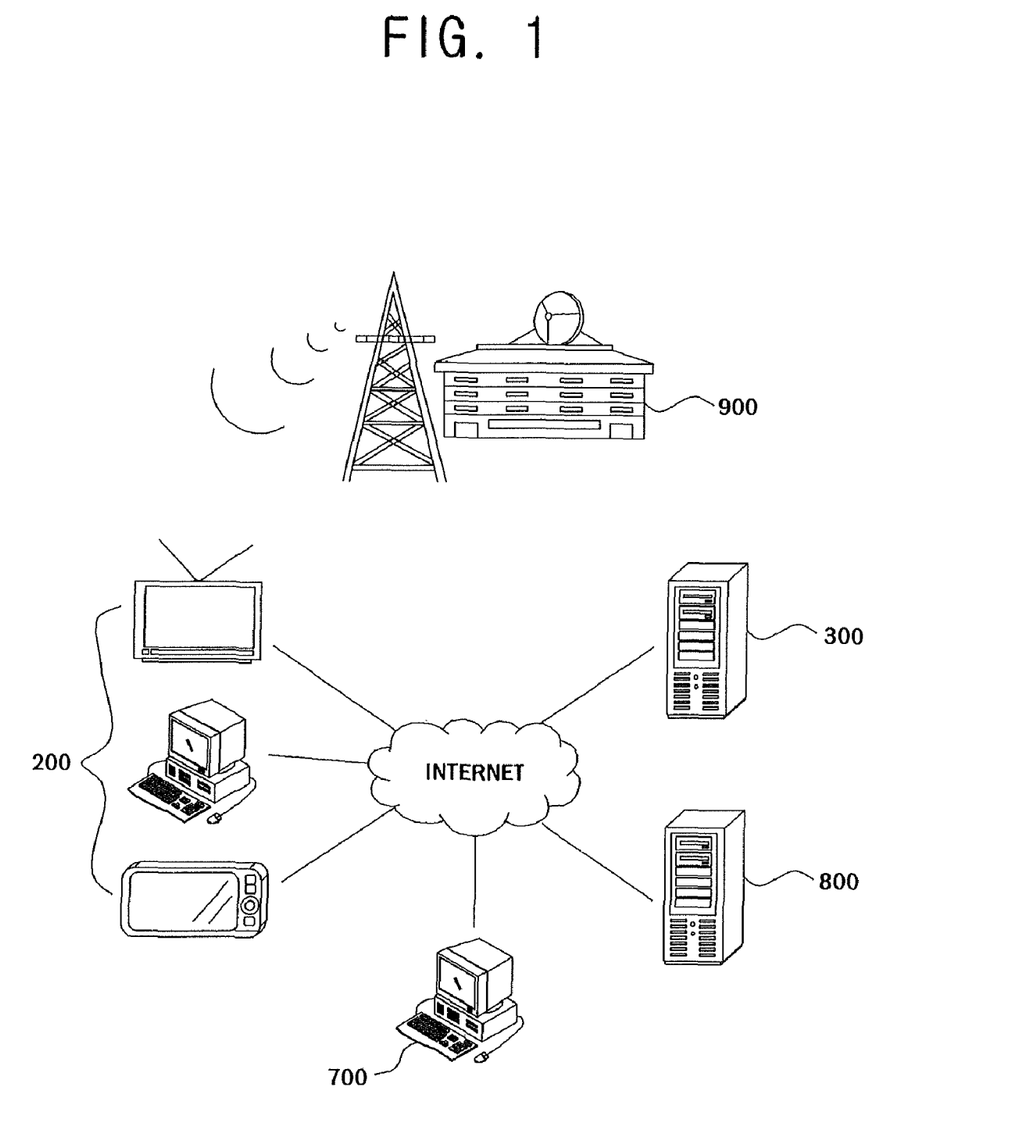
FIG. 1 is a schematic diagram showing an entire configuration of a system in accordance with the present invention.

FIG. 1 is a schematic diagram showing the entire configuration of a system in accordance with the present invention.

A terminal 200 may include a variety of digital devices connectable with a network, such as a set-top box well known as the most common terminal for providing a two-way communication service, a personal computer, a mobile phone, a Personal Digital Assistant (PDA), a Portable Multimedia Player (PMP) and the like.

The terminal 200 may receive a broadcasting signal from a broadcasting system 900 and then display the broadcasting signal on a screen of the terminal 200. Alternatively, the terminal 200 may download image data from a content server 800 and then replay or display the downloaded image data on the screen. The terminal 200 will be described in more detail with reference to FIG. 2.

By referring to FIG. 1, if the user selects one of images of products included in the image data played or displayed on the screen, detailed information related to the selected product may be obtained from a retrieval server 300 by transmitting information on the selected product to the retrieval server 300, or information on specific products having an image same as or similar to the image of the selected product among a plurality of products provided from advertisers may be provided to the terminal 200 after a right for providing the user with the information on the products is sold to the advertisers by linking with an advertisement system 700.

Although it is shown in FIG. 1 that the retrieval server 300 and the content server 800 are separated from each other, the retrieval server 300 and the content server 800 may be configured as one system or be physically included in one server.

Configuration of Terminal

Figure 2:
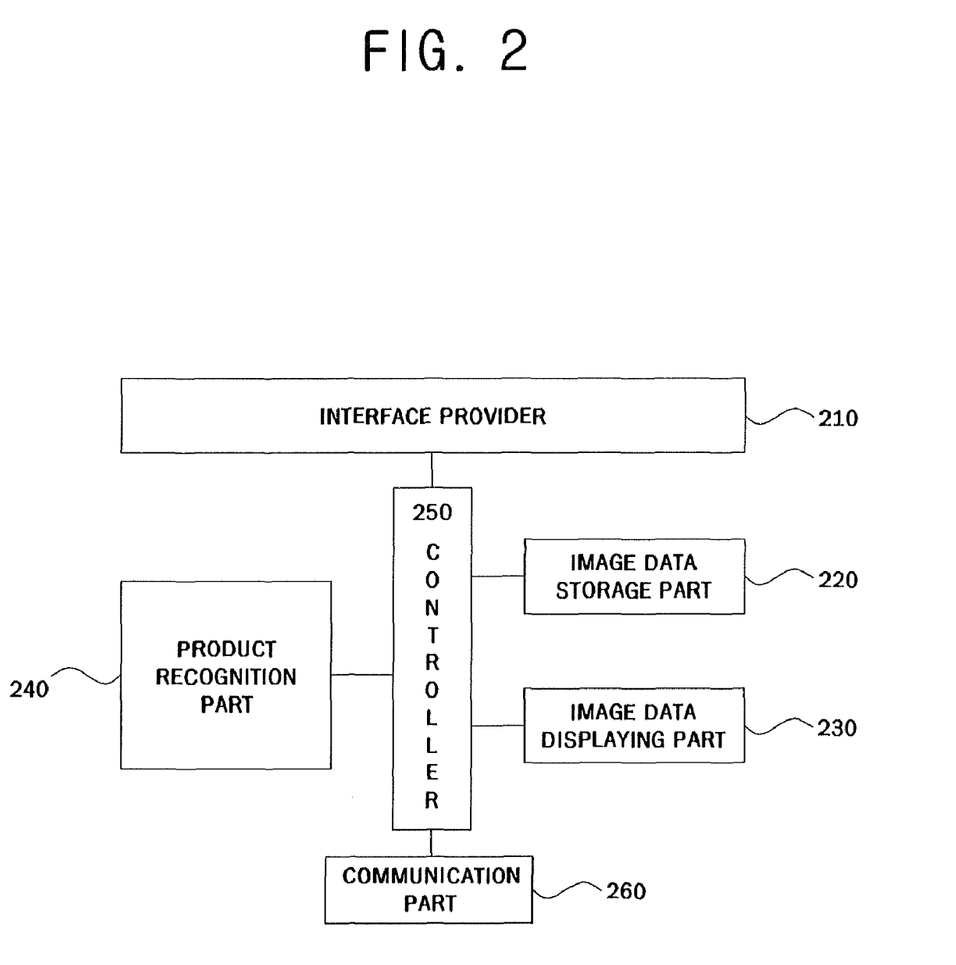
FIG. 2 is a block diagram showing components included in a terminal in accordance with the present invention.

FIG. 2 is a block diagram showing components of the terminal 200 in accordance with the present invention.

The terminal 200 may include an interface provider 210, an image data storage part 220, an image data displaying part 230, a product recognition part 240, a controller 250, and a communication part 260.

In accordance with one example embodiment of the present invention, at least some of the interface provider 210, the image data storage part 220, the image data displaying part 230, the product recognition part 240, the controller 250, and the communication part 260 may be program modules included in the terminal 200 or communicating with the terminal 200 even though it is exemplified in FIG. 2 that all of the interface provider 210, the image data storage part 220, the image data displaying part 230, the product recognition part 240, the controller 250, and the communication part 260 are included in the terminal 200. Such program modules may be included in the terminal 200 in a form of an operating system, an application program module and other program modules, or they may be stored either in various storage devices well known to those skilled in the art or in a remote storage device capable of communicating with the terminal 200. The program modules may include but not be subject to a routine, a subroutine, a program, an object, a component, and a data structure for executing a specific operation or a type of specific abstract data that will be described in accordance with the present invention.

First, the image data storage part 220 may record information on image data received through the communication part 260 in a memory (not shown) of the terminal 200.

Further, the image data displaying part 230 can display the image data on a screen of the terminal 200.

Moreover, the product recognition part 240 can detect and recognize images of products appearing in the image data displayed on the screen. The processes performed by the product recognition part 240 will be described in more detail with reference to FIGS. 3 and 4.

Furthermore, the interface provider 210 may provide the user with candidate regions recognized as regions having the images of the products by the product recognition part 240 and with a function capable of selecting at least one of the candidate regions. Furthermore, the interface provider 210 may transmit an image of a product selected by the user to the retrieval server 300 and the advertisement system 700 and so on and provide the user with detailed information related to the selected product if the detailed information is provided by the retrieval server 300 and the advertisement system 700. At this place, an enlarged retrieval server 300' may be implemented by combining the retrieval server 300 and the advertisement system 700. In this case, retrieval results provided by the enlarged retrieval server 300' may include both general information and advertisement information.

Herein, it should be noted that the retrieval server 300 can include the enlarged retrieval server 300' even though there is no particular mention in this specification.

The controller 250 can control data flow among the interface provider 210, the image data storage part 220, the image data displaying part 230, the product recognition part 240, and the communication part 260.

The communication part 260 can receive and transmit data between the terminal 200 and the retrieval server 300, between the terminal 200 and the content server 800, and between the terminal 200 and the broadcasting system 900.

Detecting Location of Product from Image Data

Figure 3:
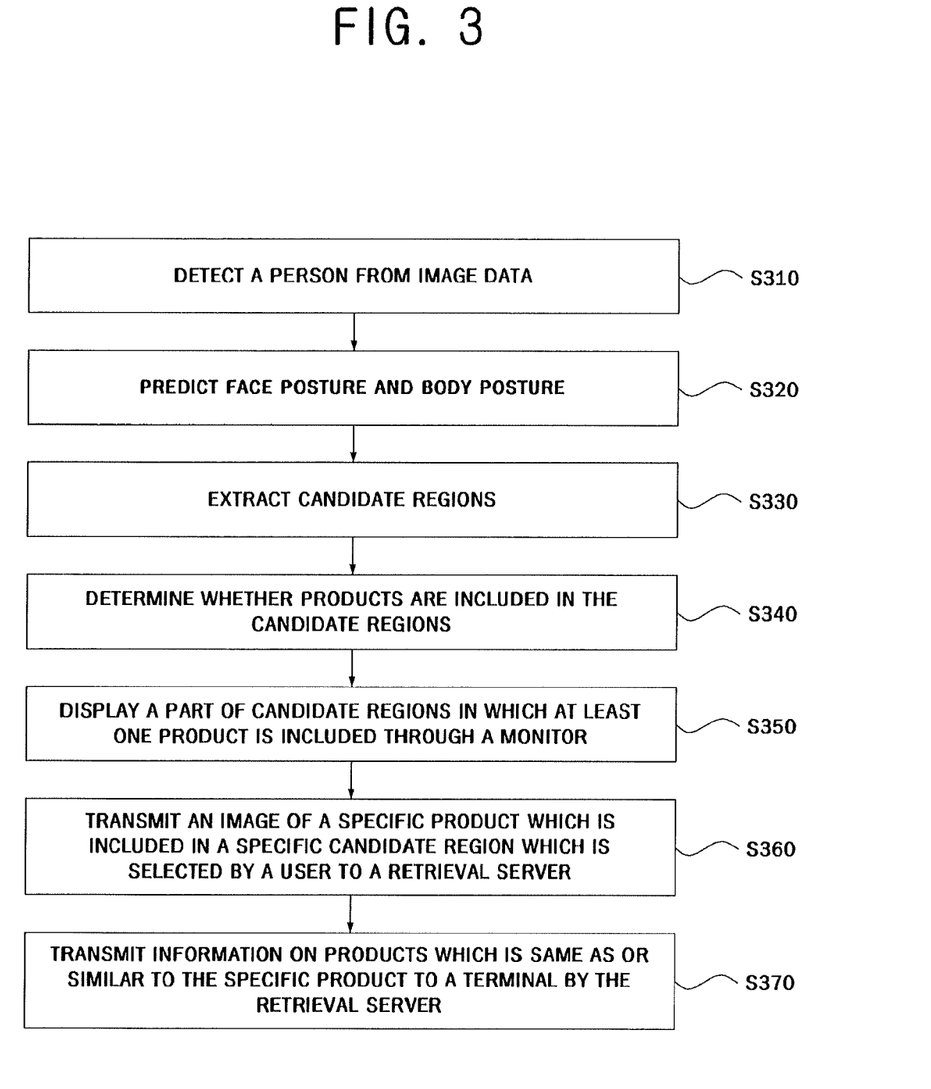
FIG. 3 is a flowchart illustrating a process of retrieving and displaying information on products same as or similar to images of products appearing in image data.

FIG. 3 is a flowchart illustrating a process of retrieving and displaying information on products same as or similar to images of products appearing in image data.

Figure 4:
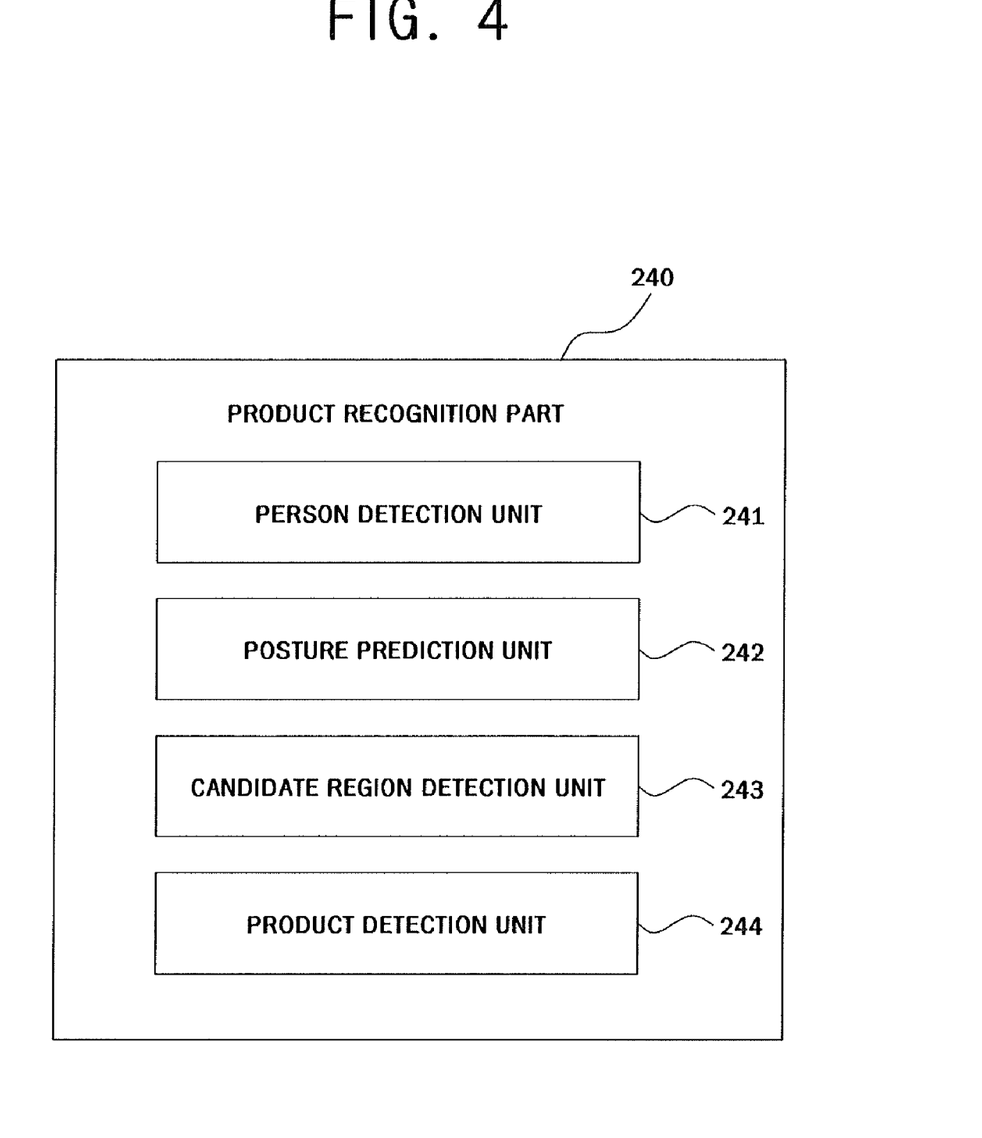
FIG. 4 is a block diagram showing components included in a product recognition part in accordance with the present invention.

Further, FIG. 4 is a block diagram showing components of the product recognition part 240 in accordance with the present invention.

Hereinafter, a case where the images of the products are included in image data will be first described and then another case where the images of the products are included in moving picture data will be described.

At step S310, the product recognition part 240 of the terminal 200 determines whether a person is included in the image data displayed on the screen of the terminal 200.

The step S310 may be automatically executed at a time when the image data is displayed on the terminal 200, but it is not limited thereto. The product recognition part 240 may include a person detection unit 241 for detecting the person from the image data as shown in FIG. 4.

Whether the person is included in the image data may be determined by detecting a face of the person from the image data, by referring to a paper entitled "Vector Boosting for Rotation Invariant Multi-View Face Detection" by Chang HUANG et al., presented in ICCV (International Conference on Computer Vision) 2005. According to pages 3 and 4 of the paper, a method for detecting a face swiftly and correctly by expressing a result of learning features of the face through a plurality of face samples by using simple operation such as addition and subtraction is disclosed.

Alternatively, whether the person is included in the image data may be determined by detecting a body of the person from the image data, by referring to a paper entitled "Pedestrian Detection using Wavelet Templates" by Oren et al., presented in CVPR (Computer Vision and Pattern Recognition Conference) 1997. According to pages 2-5 of the paper, a method for detecting a body of a person quickly and accurately by expressing a result of learning features of the body through a plurality of body samples by using simple wavelet operation is disclosed.

A method for detecting whether the person is included in the image data may not be limited to the techniques presented in the aforementioned papers, and it may also be executed by combining other various techniques.

If it is determined that a person is included in the image data on the basis of one of the aforementioned various techniques, the product recognition part 240 predicts a posture of the person, i.e., a face posture and a body posture (S320).

In the concrete, the face posture represents the position, the size, the direction of physical parts of the face, including eyes, a nose, a mouth, ears, hair and so on. And the body posture means the position, the size, the direction of physical parts of the body except the face, including the upper and the lower part of the body, arms, legs, wrists, ankles, hands, feet and the like.

Products such as glasses, a mask, earrings, a hat, an upper garment, a lower garment, a bracelet, shoes and so on are most likely to be located in the above-mentioned physical parts. Thus, at step S330 which will be explained later, the positions of the physical parts (also referred to as initial postures) may be determined as candidate regions having high probabilities of the products to be located therein.

That is, the posture of the person should be predicted at step S320 because the positions of the products which the person is wearing are subject to the face posture and the body posture of the person. The product recognition part 240 may include a posture prediction unit 242 in order to predict the posture of the person as shown in FIG. 4.

As described above, the posture of the person could be predicted by dividing it into the face posture and the body posture and predicting them. First, a process of predicting the face posture may be performed by referring to the above-mentioned paper entitled "Vector Boosting for Rotation Invariant Multi-View Face Detection" by Chang HUANG et al. Specifically, according to pages 1-3 of this paper, MVFD (Multi-View Face Detector) using the Parallel Cascades structure, the Pyramid structure, and the Tree structure in order to predict the face posture is disclosed and further WFS (Width First Search) tree structure which overcomes the shortcomings of the MVFD is disclosed. Moreover, a process of predicting the body posture including the face posture may be performed by referring to a paper entitled "Pictorial Structures for Object Recognition" by Predo F. Felzenszwalb et al., published in International Journal of Computer Vision in January 2005. Specifically, according to pages 8-32 of this paper, a method for expressing a result of learning features of each element, e.g., arm, leg, of the body through the Gabor Filter Response and obtaining the body posture which corresponds to the maximum possibility by calculating the combination of each element of the body on the basis of the possibility are disclosed in order to predict the body posture.

The process of predicting the posture of the person at step 320 may be performed not only after the step 310 for detecting the person from the image data is completed but also at the same time with the step 310.

At step 330, the product recognition part 240 extracts one or more candidate regions after the posture of the person is predicted at the step 320.

In other words, initial postures where there are physical parts including a torso, a neck, ears, a head, and eyes may be extracted as the candidate regions from the image data by taking the posture into consideration.

The physical parts which can be selected as the candidate regions may be previously arranged or be updated periodically or aperiodically from a remote server such as the retrieval server 300 over the network. In order to determine the candidate regions, the product recognition part 240 may include a candidate region detection unit 243 for detecting the candidate regions.

Meanwhile, the respective physical parts which can be selected as the candidate regions and types of products which can be located in each physical part may also be recorded in a database (not shown) by matching the respective physical parts with the corresponding types of the products.

If the candidate regions are extracted from the image data, the product recognition part 240 checks whether any product exists in each candidate region at step S340.

For instance, if the candidate region is an ear region, it is determined whether an earring exists in the ear region by using an earring detector. Or if the candidate region is a neck region, it is determined whether a necklace or a scarf exists in the neck region by using a necklace detector or a scarf detector. In order to check whether the product exists in the corresponding candidate region, the product recognition part 240 may include a product detection unit 244.

In accordance with one example embodiment of the present invention, each detector for detecting products which exist in each candidate region may be implemented by using various techniques, e.g., a technique for determining whether the product exists in the corresponding candidate region by analyzing a skin region in the corresponding candidate region.

For example, (i) if an candidate region, e.g., the ear region or the neck region, is full of skin color, (ii) if the candidate region includes the skin area occupying a considerable part thereof and at the same time no metallic material is detected in the candidate region, or (iii) if a general shape of the product such as earring or the necklace is not detected from the candidate region, it may be determined that no corresponding product exists in the candidate region. Otherwise, it may be determined that the corresponding product exists in the candidate region.

Specifically, the product such as the earring or the necklace may be detected from the candidate region by calculating a proportion of the skin color in the candidate region, by referring to a paper entitled "Statistical Color Models with Application to Skin Detection" by Michael J. Jones et al., published in International Journal of Computer Vision in January 2002.

For another example, it may also be detected whether the product such as a hat, a hairpin exists in the candidate region by calculating a proportion of the hair color in the candidate region.

In accordance with another example embodiment of the present invention, a detector for detecting products which may exist in each candidate region can be implemented by using a shape recognition technique (see Korean Patent Application No. 10-1995-0000566 filed on Jan. 14, 1995). The shape recognition technique may be more adequately adopted to detect the product such as a handbag not attached to the skin of the person. In the concrete, the product recognition part 240 may check whether either a shape of a product connected to the person by way of a strap, a handle and so on or the entire shape of the product exists in the image data and then determine whether the product such as a handbag, an umbrella and so on exists in the image data.

In accordance with still another embodiment of the present invention, a detector for detecting a product which exists in each candidate region may be implemented by using a method prepared by combining the skin region detection technique and the shape recognition technique. The method may be more adequate for the case in which various kinds of products exist in one candidate region. For example, in case the candidate region is a wrist region, even though it is determined that products exist in the wrist region by calculating the proportion of the skin region in the wrist, the products may include various ones such as a bracelet and a wristwatch and so forth. Therefore, the method may check the kinds of the products more precisely by combining the skin region detection technique and the shape recognition technique.

However, in case it is unclear whether a product exists in a candidate region even if the aforementioned detection techniques are used, it may be determined that a product exists in the candidate region as a default value.

Meanwhile, in accordance with the present invention, it is not always required to determine what kind of product is included in a candidate region as described at step S340. That is, whether the product in the wrist region is a bracelet or a wristwatch does not need to be determined by the product recognition part 240. Since the retrieval server 300 can retrieve products same as or similar to images of products included in a selected candidate region and then provide the user with the retrieved products as will be described later on, the product recognition part 240 may choose only a candidate region in which a product is included without the need to consider a product type.

A specific candidate region(s) in which a product(s) is determined to be included may be displayed on the screen of the terminal 200 at step S350. In this case, only the specific candidate region in which the product is determined to be included is not necessarily displayed on the screen of the terminal 200. That is, by displaying candidate regions where no product is included through the screen of the terminal 200 in some cases, the inaccuracy of the detector can be overcome and the user can make more precise determination (by referring to provided information such as relative positions among the candidate regions and the like). In order to display all the candidate regions without having to check whether there is any product therein through the screen, it may be more suitable to omit the product detection step (S340), and instead, directly display the candidate regions which are extracted from the image data at step S330 through the screen of the terminal 200. It is reasonable, because it is natural for the user not to select a candidate region among the displayed candidate regions in case no product is included in the candidate region.

Figure 5:
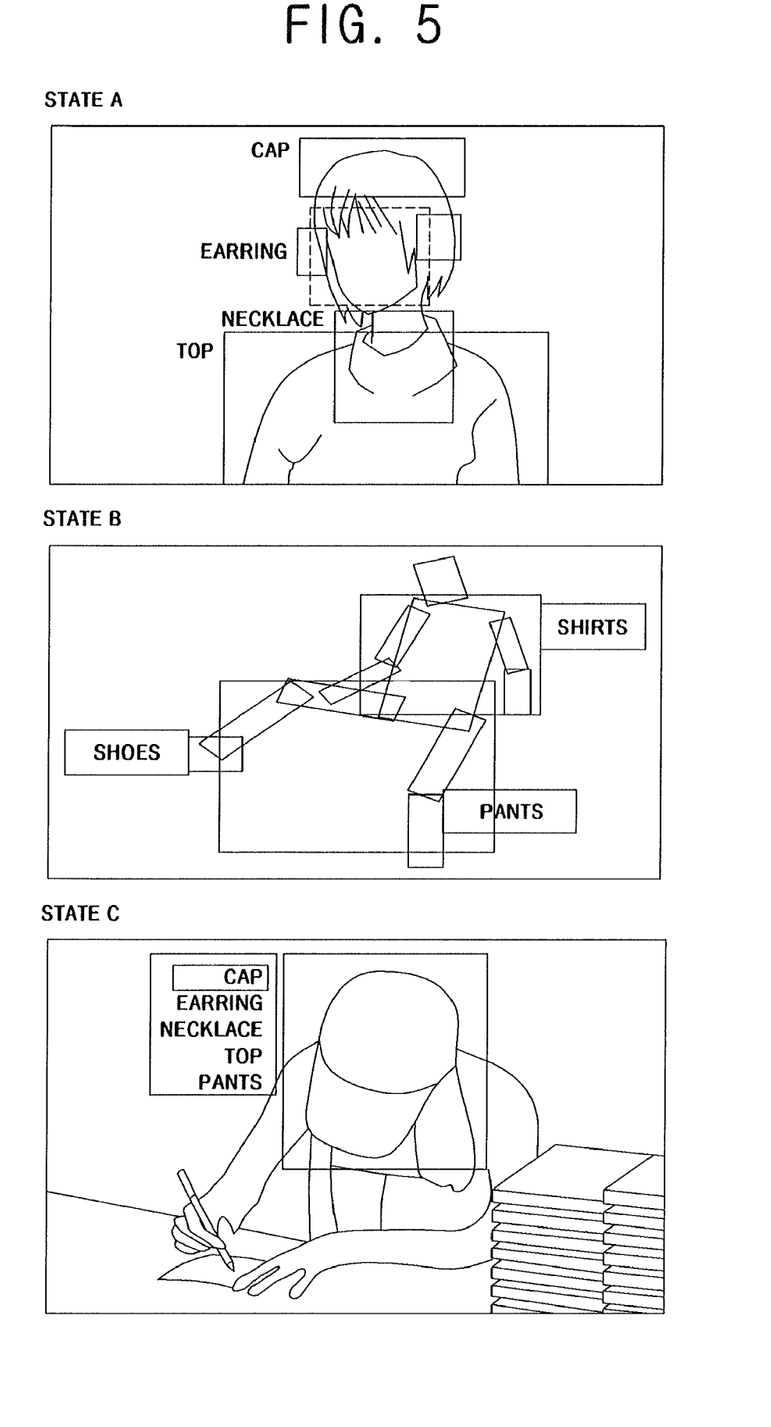
FIG. 5 shows states where candidate regions are recommended on the screen of the terminal.

FIG. 5 shows states where candidate regions are recommended on the screen of the terminal 200.

The state A represents candidate regions in which there may be any product are being recommended by detecting the face posture and the like. Herein, the candidate regions indicating parts of the human body in which there may be product(s) such as a upper garment, a necklace, earrings, a hat and so on are displayed. In detail, the head part is also recommended as one of the candidate regions even though no hat has been detected in the head.

The state B depicts candidate regions in which there may be product(s) such as shirts, pants, shoes and so forth are being recommended by predicting the body posture.

Referring to the states A and B, when each candidate region is displayed on the screen of the terminal 200, a category of the products may also be displayed in one side of each candidate region. If information such as the category of the products is used for the retrieval of the products, retrieval targets may be confined to a specific category of products, resulting in more rapid and precise retrieval.

In the mean time, the face of a person may be not detected in some cases even though it has been detected at step S310 that the person is included in the image data. For example, in case a person leans his or her head forward like the state C, candidate regions may be provided to the terminal 200 by analyzing the posture of the image itself shown on the screen and, if a specific candidate region among the candidate regions is selected by the user, a category list including a plurality of categories of the products may be provided on one side of the selected candidate region in order to enable the user to select one category from the category list. The state C shows that the user selects the head region and selects "cap" as the corresponding category.

In addition, the interface provider 210 displays the candidate regions in which product(s) may be included and the corresponding category on the terminal 200 as shown in the states A and B and receives information on a desired candidate region which is selected by a user, from at least one candidate region. To this end, the interface provider 210 may provide the user with a function for selecting the candidate region by means of, e.g., a pointing device such as a mouse, a keypad, a keyboard and the like.

If the user selects a specific candidate region, the terminal 200 transmits the information on the product(s), e.g., the image of the product(s), included in the specific candidate region to the retrieval server 300 at step S360. The retrieval server 300 sends out detailed information on the product(s) corresponding to the received image to the terminal 200 as a retrieval result so that the user can be provided with the detailed information at step S370. That is, after the similarity between the image of the product received from the terminal 200 and the image of the product having been acquired by the retrieval server 300 may be compared by the retrieval server 300, the information on the products that corresponds to the image of the product received from the terminal 200 can be obtained. The similarity between images may be compared by referring to various methods including a technique disclosed in Korean Patent Application No. 10-2002-0067514 filed on May 7, 2002 by Koninklijke Philips Electronics, N.V.

To be more specific, after the similarity of colors, patterns, shapes of the received image of the product is taken into account by the retrieval server 300, information on at least one product corresponding to the received image of the product can be offered to the terminal 200 as the retrieval result.

Herein, the similarity between the colors may be distinguished by referring to a technique disclosed in a paper entitled "An Efficient Color Representation for Image Retrieval" by Yining Deng et al., presented in IEEE TRANSACTIONS ON IMAGE PROCESSING in January 2001.

In addition, the similarity between the patterns may be distinguished by referring to a technique disclosed in a paper entitled "Texture Recognition Using a Non-Parametric Multi-Scale Statistical Model" by Jeremy S. De Bonet et al., presented in Conference on Computer Vision and Pattern Recognition in 1998.

Furthermore, the similarity between the shapes may be distinguished by referring to a technique disclosed in a paper entitled "Shape Matching and Object Recognitions Using Shape Contexts" by Serge Belongie et al., presented in IEEE TRANSACTIONS ON PATTERN ANALYSIS AND MACHINE INTELLIGENCE in April 2002.

However, it should be noted that techniques other than the aforementioned techniques may be used for distinguishing the similarity between the colors, the patterns or the shapes.

In order to distinguish the similarity between the colors, the patterns or the shapes, the retrieval server 300 may include a product database (not shown) in which the image of the product and detailed information corresponding to the product are stored. The detailed information may be collected by web crawling on the Internet by the retrieval server 300. At this time; since the retrieval server 300 includes a system with an enlarged concept such as the advertisement system 700 as described above, the retrieval server 300 may provide the information on the product advertisement.

The retrieval server 300 transmits to the terminal 200 information on at least one product determined to be similar to or same as the image of the product received from the terminal 200. The information on at least one product may include a name, a price, a provider, a size of the product and a place where the product is bought. For another example, the retrieval server 300 may transmit only list of singular or plural products determined to be similar to or same as the received image to the terminal 200 and then send out more detailed information on a specific product included in the list if the user of the terminal 200 selects the specific product.

Herein, it should be noted that the aforementioned description may be also applied even to the case in which the data includes the moving picture although the description has been presented in the limited case where the data is the image. To accomplish this, the moving picture may be changed into the image data by capturing scenes included in the moving picture. For instance, a specific scene in which the product the user gets interested in is included may be captured from the broadcasting program while the user is watching the broadcasting program and the techniques having been applied to the image data as describe above (e.g., as illustrated in FIG. 3) may also be applied to the image data, i.e., the specific scene, captured from the broadcasting program in the same manner. For another instance, the screen capturing may be periodically performed on scenes of the moving picture by the terminal 200 irrespective of a request from the user.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a-field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for providing information on a product, the method comprising the steps of:
    (a) determining a posture of a person included in image data;
    (b) determining candidate regions having probabilities of including images of products by referring to the posture of the person, said probabilities being over a predetermined threshold value and then displaying the candidate regions on a terminal; and
    (c) upon receiving selection of one of the candidate regions, requesting to a server product information related to a product included in the selected candidate region.

2. The method of claim 1, wherein the posture of the person includes at least one of a face posture and a body posture of the person.

3. The method of claim 2, wherein the step (b) includes the step of determining physical parts of the person to which the products are attachable as the candidate regions by using information on the face posture and the body posture.

4. The method of claim 1, wherein the step (b) includes the step of displaying only one or more candidate regions having at least one image of the product among the candidate regions on the terminal.

5. The method of claim 1, wherein, at the step (c), an image of the product is transmitted to a retrieval server by the terminal.

6. The method of claim 5, wherein, at the step (c), a retrieval result which is related to the product is received from the retrieval server by the terminal.

7. The method of claim 6, wherein the retrieval result includes information on at least one product determined to be same as or similar to the product.

8. The method of claim 7, wherein the retrieval result is obtained in such a manner that information on the product determined to be same as or similar to the image of the product is retrieved by the retrieval server using an image matching technique.

9. The method of claim 1, wherein the step (b) includes the step of displaying information on a category of products having probabilities of being included in the candidate regions in one side of the candidate regions, when the candidate regions are displayed through the terminal.

10. The method of claim 1, wherein, at the step (b), the candidate regions are displayed even if a face of the person is not detected.

11. An apparatus for providing information on products appearing in image data, the apparatus comprising:
    one or more processors comprising:
        a posture prediction part for determining a posture of a person included in image data by analyzing at least one of a face posture and a body posture of the person;
        a candidate region extraction part for determining one or more anatomical parts of the person to be candidate regions having probabilities of including images of products based on the posture of the person, the probabilities being over a predetermined threshold value and then displaying the candidate regions on a screen; and
        a communication part for requesting a retrieval server through a network to retrieve information on a product included in the selected candidate region, upon receiving selection of one of the candidate regions.

12. The apparatus of claim 11, wherein the candidate region extraction part displays only candidate regions having images of the products therein among the candidate regions on the screen.

13. The apparatus of claim 11, wherein the communication part transmits an image of the specific product to the retrieval server and then receives information on a product(s) determined to be same as or similar to the specific product from the retrieval server.

14. The apparatus of claim 11, wherein the candidate region extraction part displays information on categories of products having probabilities of being included in the candidate regions in one side of the candidate regions, while the candidate regions are displayed.

15. The apparatus of claim 11, further comprising: a product detection part for detecting whether products are included in the candidate regions.

16. The apparatus of claim 11, wherein the retrieval server includes a product database in which images of products and detailed information corresponding to the products are stored.

17. The apparatus of claim 16, wherein the retrieval server collects the information on the products stored in the product database by a web crawling over the Internet.

18. The apparatus of claim 11, wherein the retrieval server retrieves advertisement information related to the specific product and then provides the screen with the advertisement information.

19. One or more computer-readable recording media having stored thereon a computer program that, when executed by one or more processors, causes the one or more processors to perform acts including:

determining a posture of a person included in image data;
determining candidate regions having probabilities of including images of products by referring to the posture of the person, said probabilities being over a predetermined threshold value and then displaying the candidate regions on a terminal; and upon receiving selection of one of the candidate regions, requesting to a server product information related to a product included in the selected candidate region.

* * * * *